(12) United States Patent
Parker et al.

(10) Patent No.: US 7,952,328 B2
(45) Date of Patent: May 31, 2011

(54) MULTI-BATTERY CHARGING SYSTEM AND METHOD

(75) Inventors: Jeffrey C. Parker, Magnolia, TX (US); James L. Mondshine, Cypress, TX (US); Valiuddin Y. Ali, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 805 days.

(21) Appl. No.: 11/786,531

(22) Filed: Apr. 12, 2007

(65) Prior Publication Data

US 2008/0252256 A1    Oct. 16, 2008

(51) Int. Cl.
*H02J 7/00* (2006.01)
(52) U.S. Cl. ......... 320/124; 320/112; 320/113; 320/114
(58) Field of Classification Search ............... 320/125, 320/112–114, 103
See application file for complete search history.

(56) References Cited

U.S. PATENT DOCUMENTS

| | | | | |
|---|---|---|---|---|
| 5,563,493 A * | 10/1996 | Matsuda et al. | ............... | 320/124 |
| 6,005,368 A * | 12/1999 | Frame | ........................... | 320/113 |
| 6,160,378 A | 12/2000 | Helot et al. | | |
| 6,184,652 B1 | 2/2001 | Yang | | |
| 6,194,867 B1 * | 2/2001 | Cummings et al. | ........... | 320/119 |
| 6,211,649 B1 | 4/2001 | Matsuda | | |
| 6,396,243 B2 * | 5/2002 | Odaohhara | ................... | 320/116 |
| 6,888,338 B1 * | 5/2005 | Popescu-Stanesti et al. | . | 320/137 |
| 2002/0005707 A1 | 1/2002 | Kerai | | |
| 2003/0117109 A1 * | 6/2003 | Trepka | ........................ | 320/126 |
| 2004/0051497 A1 | 3/2004 | Richards et al. | | |
| 2004/0246341 A1 | 12/2004 | Lee | | |
| 2005/0083014 A1 | 4/2005 | Baumgartner | | |
| 2005/0275372 A1 | 12/2005 | Crowell | | |

* cited by examiner

*Primary Examiner* — Patrick J Assouad
*Assistant Examiner* — Samuel Berhanu

(57) ABSTRACT

A multi-battery charging system comprises a computing device having a controller configured to control a plurality of power regulators, each of the plurality of power regulators for regulating charging power to a respective battery, at least one of the power regulators disposed external to the computing device.

20 Claims, 3 Drawing Sheets

MULTI-BATTERY CHARGING SYSTEM AND METHOD

BACKGROUND

Notebook computers are generally capable of using internal rechargeable batteries and/or external rechargeable batteries (travel batteries) as power supplies. Notebook computers may also be docked in a docking station alone or with an external battery attached thereto, which enables the batteries to be charged from an external power supply. Typically, the charging cycle for both internal and external batteries is controlled by a circuit inside the notebook computer. However, in order to keep cost and weight low for the notebook computer, the charging components are capable of handling only enough current to charge one battery, thereby resulting in an extended delay if more than a single battery needs charging.

BRIEF DESCRIPTION OF THE DRAWINGS

For a more complete understanding of the present application, the objects and advantages thereof, reference is now made to the following descriptions taken in conjunction with the accompanying drawings, in which.

DETAILED DESCRIPTION OF THE DRAWINGS

Figure 1:
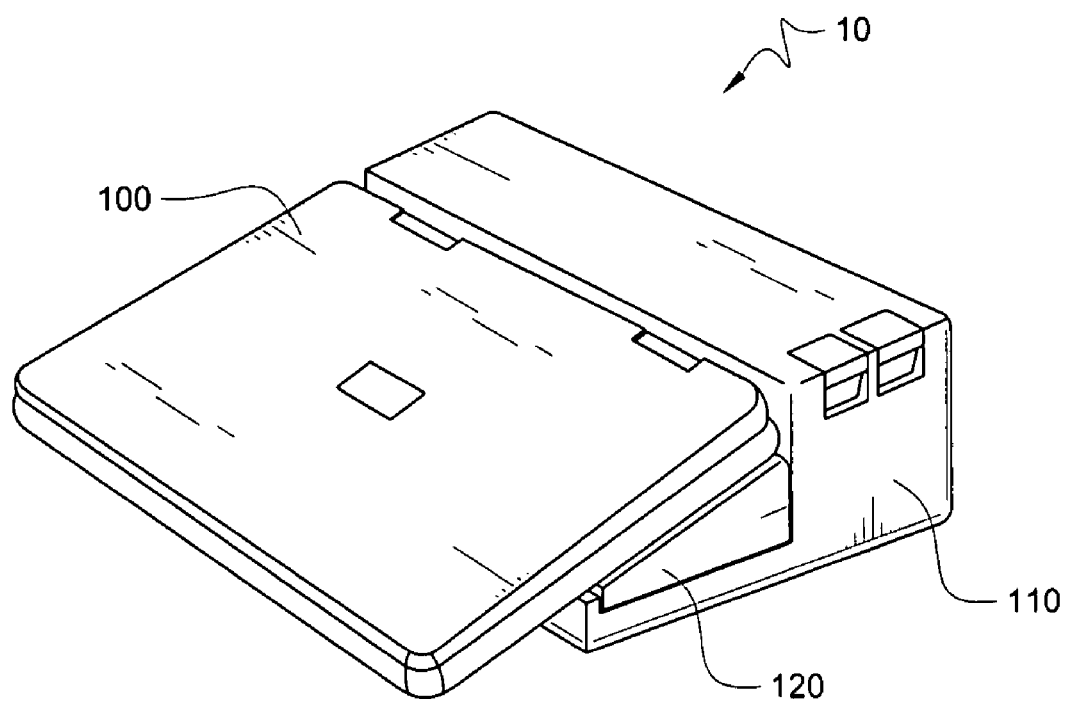
FIG. 1 is a diagram illustrating an embodiment of a multi-battery charging system.

FIG. 1 is a diagram illustrating an embodiment of a multi-battery charging system 10. In some embodiments, system 10 enables two or more batteries to be charged concurrently or sequentially. In the embodiment illustrated in FIG. 1, system 10 comprises a computing device 100 coupled to a docking station 110. In the embodiment illustrated in FIG. 1, computing device 100 comprises a notebook computer. However, it should be understood that computing device 100 may be any type of computing device including, but not limited to, a personal digital assistant (PDA), an audio device, a video device, a gaming device, a printer, and a cellular telephone. In the illustrated embodiment, a battery 120 is coupled to computing device 100. Battery 120 is a power storage device configured to power computing device 100 when computing device 100 is not coupled to a more continuous supply of external power, such as an alternating current (AC) power source. Battery 120 may be any rechargeable power storage device suitable for supplying operating power to computing device 100 including, but not limited to, a lithium-ion battery and a supercapacitor. Docking station 110 provides a connection to an external power supply which may be used for supplying operating power to computing device 100 and/or charging one or more batteries (e.g., battery 120 and/or an internal battery of computing device 100).

Figure 2:
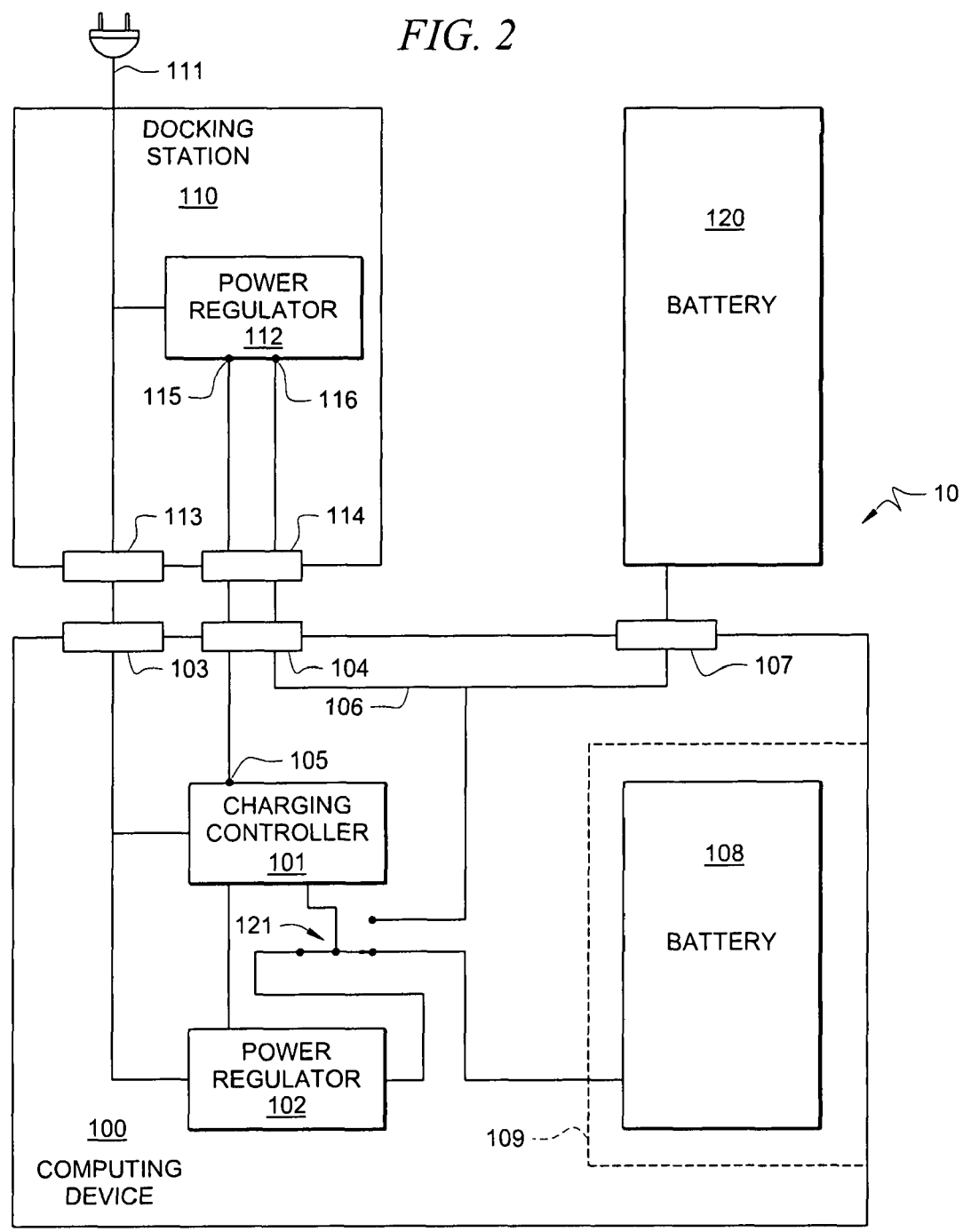
FIG. 2 is another diagram illustrating an embodiment of a multi-battery charging system.

FIG. 2 is a diagram illustrating an embodiment of multi-battery concurrent charging system 10. Docking station 110 comprises a connection to an external power supply 111, a power regulator 112, a power supply connector 113 and a charging connector 114. External power supply 111 is coupled to power supply connector 113 and power regulator 112. It should be understood that in some embodiments, power supply connector 113 and charging connector 114 may be part of the same connector. Power regulator 112 is coupled to charging connector 114 via a control port 15 and a charge power port 116. Control port 115 carries a control signal that enables power regulator 112 to be remotely controlled by computing device 100, and charge power port 116 carries the charging current for charging external battery 120.

Computing device 100 comprises a charging controller 101, a power regulator 102, a power supply connector 103, a charging connector 104, an external battery connector 107, an internal battery 108, a battery bay 109 for housing internal battery 108, and a switch 121. When computing device 100 is coupled to docking station 110, charging connector 104 is coupled to charging connector 114, and power supply connector 103 is coupled to power supply connector 113. In some embodiments, charging connector 104 and power supply connector 103 may be merged into a single connector. Charging controller 101 is coupled to power regulator 112 through control port 105, charging connector 104, charging connector 114 and control port 115. As shown in the embodiment illustrated in FIG. 2, charge power port 116 is coupled to external battery 120 through charging connector 114, charging connector 104, charge power path 106 and external battery connector 107. Charging controller 101 controls the operation of power regulator 112. For example, using control port 115 on power regulator 112, charging controller 101 monitors the voltage and current levels of the charging power flowing to external battery 120 out of charge power port 116. The placement of power regulator 112 in docking station 110 results in less weight and heat generation in computing device 100.

Charging controller 101 and power regulator 102 are also coupled to power supply connector 113 via connector 103 for receiving external power from docking station 110. Power regulator 102 is coupled to charging controller 101, power supply connector 103 and internal battery 108 through switch 121. Charging controller 101 is configured to control power regulator 102 concurrently with power regulator 112, thus enabling the charging of internal battery 108 concurrently with the charging of external battery 120. Charging controller 101 monitors the charging voltage and current going to both internal battery 108 and external battery 120 through power regulator 102 and power regulator 112, respectively. Power regulator 102 charges internal battery 108 using power supplied through power supply connector 103 and is controlled by charging controller 101. Internal battery 108 may be any rechargeable power storage device suitable for supply operating power to computing device 100 including, but not limited to, a lithium-ion battery and a supercapacitor.

Switch 121 selectively couples power regulator 102 to internal battery 108 and/or external battery 120, enabling power regulator 102 to charge internal battery 108 and/or external battery 120. Charging controller 101 controls the operation of switch 121. In some embodiments, if computing device 100 is not coupled to docking station 110 (e.g., an external power supply coupled directly to computing device 100), charging controller 101 implements a sequential charging cycle using switch 121 to couple power regulator 102 to one of internal battery 108 and external battery 120 for charging and then changes switch 121 to couple power regulator 102 to the other one of internal battery 108 and external battery 120 for charging thereof. Thus, in some embodiments, both internal battery 108 and external battery 120 may be charged, even without the use of power regulator 112 in docking station 110.

In operation, when computing device 100 is coupled to docking station 110, power regulator 112 receives a control signal from charging controller 101 through control port 115, takes power from external power supply 111, and outputs a regulated amount of power through charge power port 116. It should also be understood that, while FIG. 2 shows external battery 120 coupled to power regulator 112 through computing device 100, external battery 120 may alternatively be coupled to power regulator 112 directly such that the charging current does not pass through computing device 100.

Charging controller 101 is configured to determine whether computing device 100 is coupled to docking station 110 and to determine the charge level of both internal battery 108 and external battery 120, for example, by determining the presence or absence of a signal from docking station 110 and measuring the voltages of batteries 108 and 120. Charging controller 101 is further configured to determine which of internal battery 108 and/or external battery 120 is coupled to computing device 100. Charging controller 101 then determines which of internal battery 108 and/or external battery 120 requires charging and also whether power regulator 112 is available for charging external battery 120. If both internal battery 108 and external battery 120 require charging, and computing device 100 is coupled to docking station 110, charging controller 101 operates switch 121 to couple power regulator 102 to internal battery 108 and monitors the current levels, voltage levels and/or charging times as power regulator 102 and power regulator 112 use power from external power supply 111 to charge internal battery 108 and external battery 120, respectively. Power regulator 102 and power regulator 112 are both configured to provide indications of battery voltage and charging current to charging controller 101.

If both internal battery 108 and external battery 120 require charging, but computing device 100 is not coupled to docking station 110, charging controller 101 operates switch 121 to couple power regulator 102 to internal battery 108, and upon completion of the charging of internal battery 108, charging controller 101 operates switch 121 to couple power regulator 102 to external battery 120. Thus, charging controller 101 is configured to enable both concurrent multi-battery charging, using power regulators 102 and 112, and sequential multi-battery charging, using power regulator 102 and switch 121. If only one of internal battery 108 and external battery 120 requires charging however, charging controller 101 will use power regulator 102 and/or power regulator 112, depending on which of internal battery 108 and external battery 120 requires charging, and whether computing device 100 is coupled to docking station 110.

Figure 3:
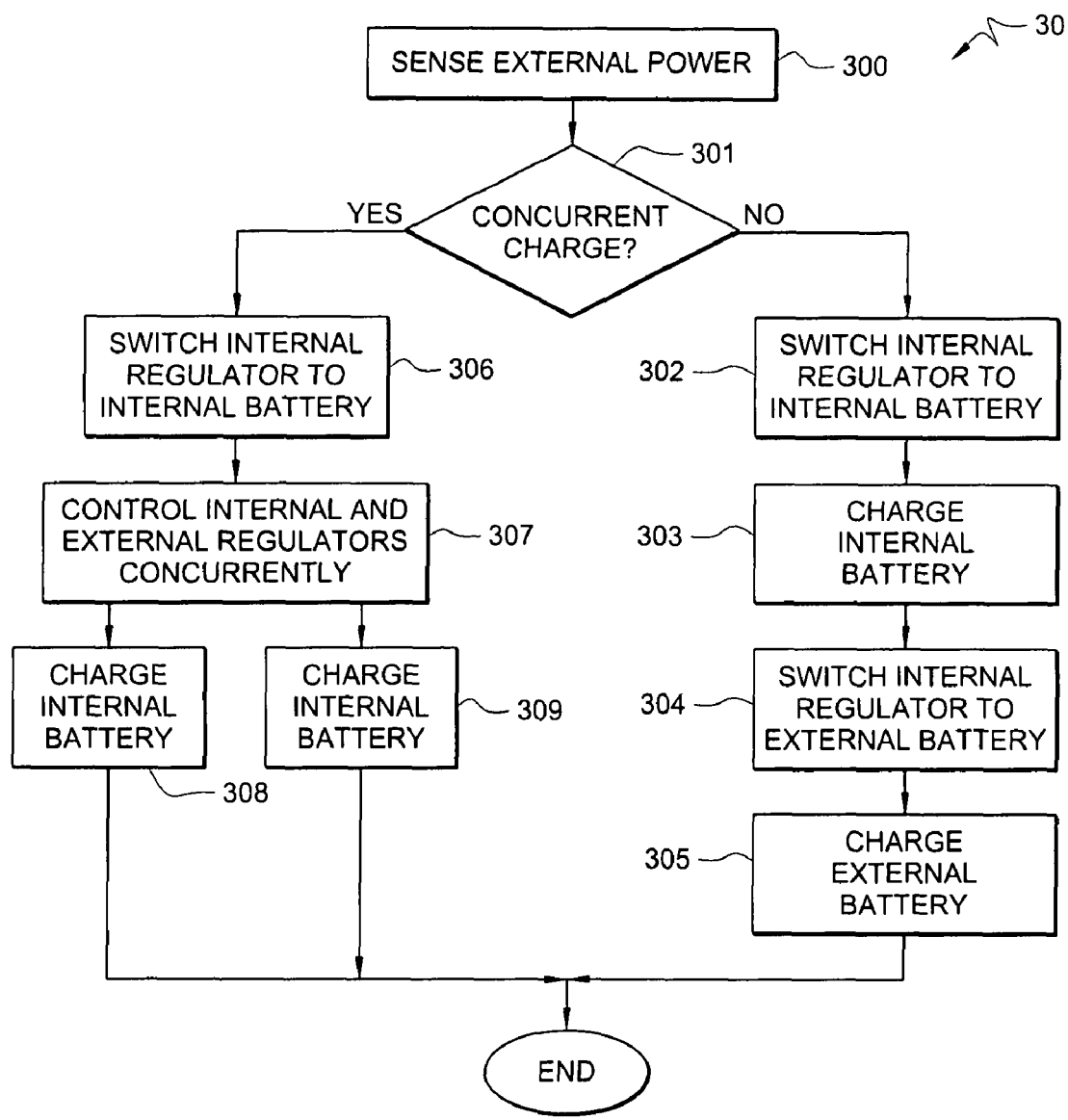
FIG. 3 is a flow diagram illustrating an embodiment of a multi-battery charging method.

FIG. 3 is a flow diagram illustrating an embodiment of a multi-battery concurrent charging method 30. Method 30 is described with reference to system 10 of FIGS. 1 and 2, although it should be understood that method 30 may be used with alternative embodiments.

At block 300, charging controller 101 senses the availability of external power from power supply connector 103. With internal battery 108 and external battery 120, both coupled to computing device 100, controller 101 determines whether internal battery 108 and external battery 120, will be charged concurrently or sequentially, at block 301. If controller 101 does not sense the connection of computing device 100 to docking station 110, indicating that power regulator 112 is not available for handling the current load used to charge external battery 120, controller 101 will determine that internal battery 108 and external battery 120 will be charged sequentially. Additionally, a user of computing device 100 may wish to configure controller 101 to charge internal battery 108 and external battery 120 sequentially. If, at decision block 301, controller 101 determines that internal battery 108 and external battery 120 will be charged sequentially, at block 302 power regulator 102 is switched into the charging path of internal battery 108 using switch 121. Internal battery 108 is charged at block 303, and at block 304, controller 101 controls switch 121 to put power regulator 102 into the charging path of external battery 120. At block 304, external battery 120 is charged.

However, at block 301, if controller 101 determines that internal battery 108 and external battery 120 will be charged concurrently, power regulator 102 is switched into the charging path of internal battery 108 using switch 121 at block 306, and controller 101 controls both power regulator 102 and power regulator 112 at block 307. Controlling both power regulator 102 and power regulator 112 concurrently enables charging internal battery 108 at block 308 and charging external battery 120 at block 309 to occur simultaneously.

What is claimed is:

1. A multi-battery charging system, comprising:
a docking station having a first power regulator;
a computing device coupled to the docking station and having a second power regulator, an internal battery, and a controller; and
an external battery that is external to and coupled to the computing device, wherein the controller controls the first and second power regulators to simultaneously charge the internal battery and the external battery.

2. The system of claim 1 wherein the controller monitors voltage and current levels of charging power flowing to the external battery using a control port on the first power regulator in the docking station.

3. The system of claim 1 wherein the controller controls the second power regulator to sequentially charge the internal battery and the external battery when the docking station is not coupled to the computing device.

4. The system of claim 1 wherein the computing device comprises a notebook computer.

5. The system of claim 1 wherein the controller determines when to sequentially charge the internal and external batteries and when to concurrently charge the internal and external batteries.

6. The system of claim 1 wherein the computing device further comprises a switch that couples the second power regulator to the controller, the internal battery, and a power supply connector that connects to the first power regulator.

7. The system of claim 1 wherein the computing device further comprises a switch that couples the second power regulator to both the internal battery and the external battery.

8. The system of claim 1, wherein the controller determines which of the internal battery and external battery requires charging and also whether the first power regulator is available for charging the external battery.

9. A multi-battery charging method, comprising:
controlling, by a computing device, a first power regulator in the computing device to charge a first battery that is internal to the computing device: and
controlling, by the computing device, a second power regulator in a docking station to charge a second battery that is external the computing device, wherein charging of the first and second batteries occurs simultaneously.

10. The method of claim 9 wherein the computing device is a notebook computer.

11. The method of claim 9 further comprising:
controlling, by the computing device, the first power regulator to charge both the first and second batteries when the computing device detects that the second power regulator in the docking station is not available for handling a load to charge the second battery.

12. The method of claim 9 further comprising:
monitoring, by the computing device, voltage and current levels of charging power flowing to the second battery using a control port on the first power regulator in the docking station.

13. The method of claim 9 further comprising:
determining, by the computing device, when to sequentially charge the first and second batteries.

14. The method of claim 9 further comprising:
reducing a weight of the computing device and reducing heat generation in the computing device by placing the first power regulator in the docking station.

15. The method of claim 9, wherein a switch coupled to the first and second power regulators enables the computing device to charge the first and second batteries.

16. A multi-battery charging system, comprising:
a notebook computer with a first power regulator and a first battery;
a docking station with a second power regulator and connected to the notebook computer; and
a second battery that is external to the notebook computer, wherein the notebook computer controls both the first power regulator and the second power regulator to concurrently charge the first battery and the second battery.

17. The system of claim 16 wherein the notebook computer further comprises a controller that controls the first power regulator to sequentially charge the first and second batteries when the notebook computer is not connected to the docking station and controls the first and second power regulators to simultaneously charge both the first and second batteries when the notebook computer is connected to the docking station.

18. The system of claim 16 wherein the notebook computer includes a controller that determines when to sequentially charge the first and second batteries and when to concurrently charge the first and second batteries.

19. A multi-battery charging system, comprising:
a docking station including a first power regulator;
a computer coupled to the docking station and including a second power regulator and a controller; and
two batteries connected to the computer or the docking station, wherein one of the two batteries is external to the computer, and the controller controls both the first and second power regulators to simultaneously charge the two batteries.

20. The system of claim 19, wherein the one of the two batteries is internal to the computer, and the controller controls the second power regulator to sequentially charge the two batteries when the docking station is not coupled to the computer.

* * * * *

UNITED STATES PATENT AND TRADEMARK OFFICE
CERTIFICATE OF CORRECTION

| | | |
|---|---|---|
| PATENT NO. | : 7,952,328 B2 | Page 1 of 1 |
| APPLICATION NO. | : 11/786531 | |
| DATED | : May 31, 2011 | |
| INVENTOR(S) | : Jeffrey C. Parker et al. | |

It is certified that error appears in the above-identified patent and that said Letters Patent is hereby corrected as shown below:

In column 4, line 55, in Claim 9, delete "device:" and insert -- device; --, therefor.

In column 4, line 58, in Claim 9, delete "external the" and insert -- external to the --, therefor.

Signed and Sealed this
Twentieth Day of December, 2011

David J. Kappos
*Director of the United States Patent and Trademark Office*

UNITED STATES PATENT AND TRADEMARK OFFICE
CERTIFICATE OF CORRECTION

PATENT NO.         : 7,952,328 B2
APPLICATION NO.    : 11/786531
DATED              : May 31, 2011
INVENTOR(S)        : Jeffrey C. Parker et al.

It is certified that error appears in the above-identified patent and that said Letters Patent is hereby corrected as shown below:

In the Drawings

In figure 3, block 309, delete "Charge Internal Battery" and insert -- Charge External Battery --, therefor.

Signed and Sealed this
Twenty-fourth Day of September, 2013

Teresa Stanek Rea
*Deputy Director of the United States Patent and Trademark Office*